United States Patent [19]

dos Santos

[11] 4,236,455

[45] Dec. 2, 1980

[54] METHOD AND APPARATUS FOR GENERATING LINEAR ELECTROMAGNETIC TRAVELLING FIELDS FOR DRIVING AND INCREASING THE ADHESIVE LOAD OF RAILWAY MOTORED VEHICLES

[76] Inventor: Jose P. dos Santos, Av. Joao Crisostomo, 70, 4.0, Lisbon 1, Portugal

[21] Appl. No.: 683,230

[22] Filed: May 4, 1976

Related U.S. Application Data

[63] Continuation-in-part of Ser. No. 497,057, Aug. 13, 1974, abandoned.

[30] Foreign Application Priority Data

Aug. 14, 1973 [PT] Portugal ................................... 60388

[51] Int. Cl.³ ............................................. B61B 13/08
[52] U.S. Cl. .......................................104/290; 310/13; 318/135
[58] Field of Search ................ 104/148 LM, 148 MS; 318/135; 310/12, 13; 105/73, 76, 77, 49

[56] References Cited

U.S. PATENT DOCUMENTS

| 557,960 | 4/1896 | Brintnell | 104/148 LM |
|---|---|---|---|
| 3,585,423 | 6/1971 | Bolton | 104/148 LM |
| 3,602,149 | 8/1971 | Lich | 104/148 LM |

FOREIGN PATENT DOCUMENTS

| 1150174 | 4/1969 | United Kingdom | 104/148 LM |
|---|---|---|---|
| 1200201 | 7/1970 | United Kingdom | 104/148 LM |

*Primary Examiner*—Reinhard J. Eisenzopf
*Attorney, Agent, or Firm*—Haseltine, Lake & Waters

[57] ABSTRACT

An electrical apparatus is disclosed to increase the adhesive load per driving axle and therefore the corresponding permissible tractive and braking forces per driving axle of locomotives and motor-coaches which travel on rails and to contribute directly to the over-all tractive force or braking force of such vehicles. In one configuration the electrical apparatus includes a system of linear inductors for generating travelling magnetic fields in the rails, the inductors including a double sequence of conjugate poles, the lines of force of which pass transversely through the upper flange of the rail. In another configuration, the electrical apparatus includes both a system of linear inductors for generating, in the rails, a magnetic field, travelling or fixed, and a conjugate system of electrical brushes for injecting, in the rails, electrical currents in controlled relationship with the magnetic field.

23 Claims, 18 Drawing Figures

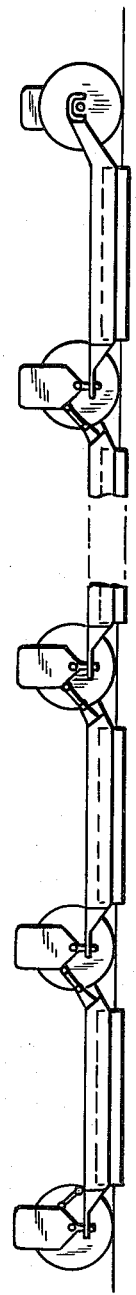
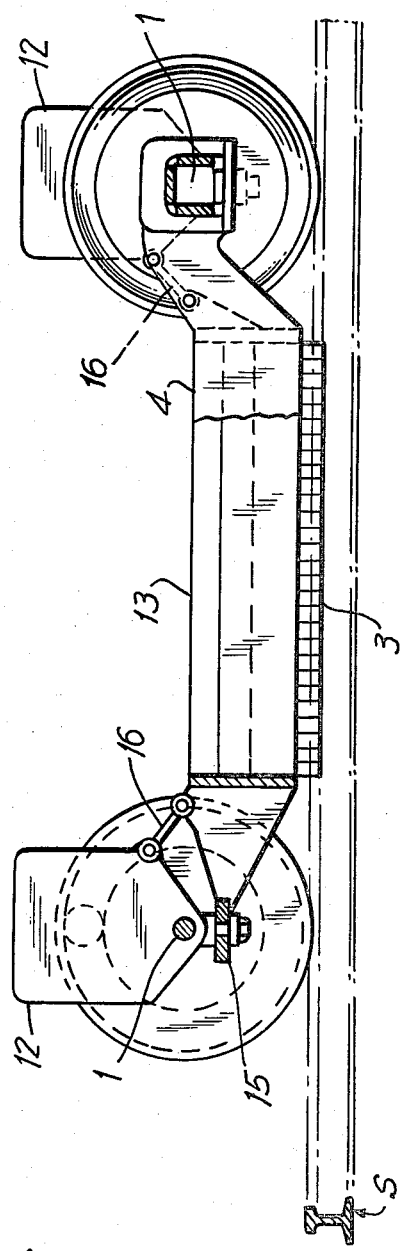
FIG. 4
FIG. 5

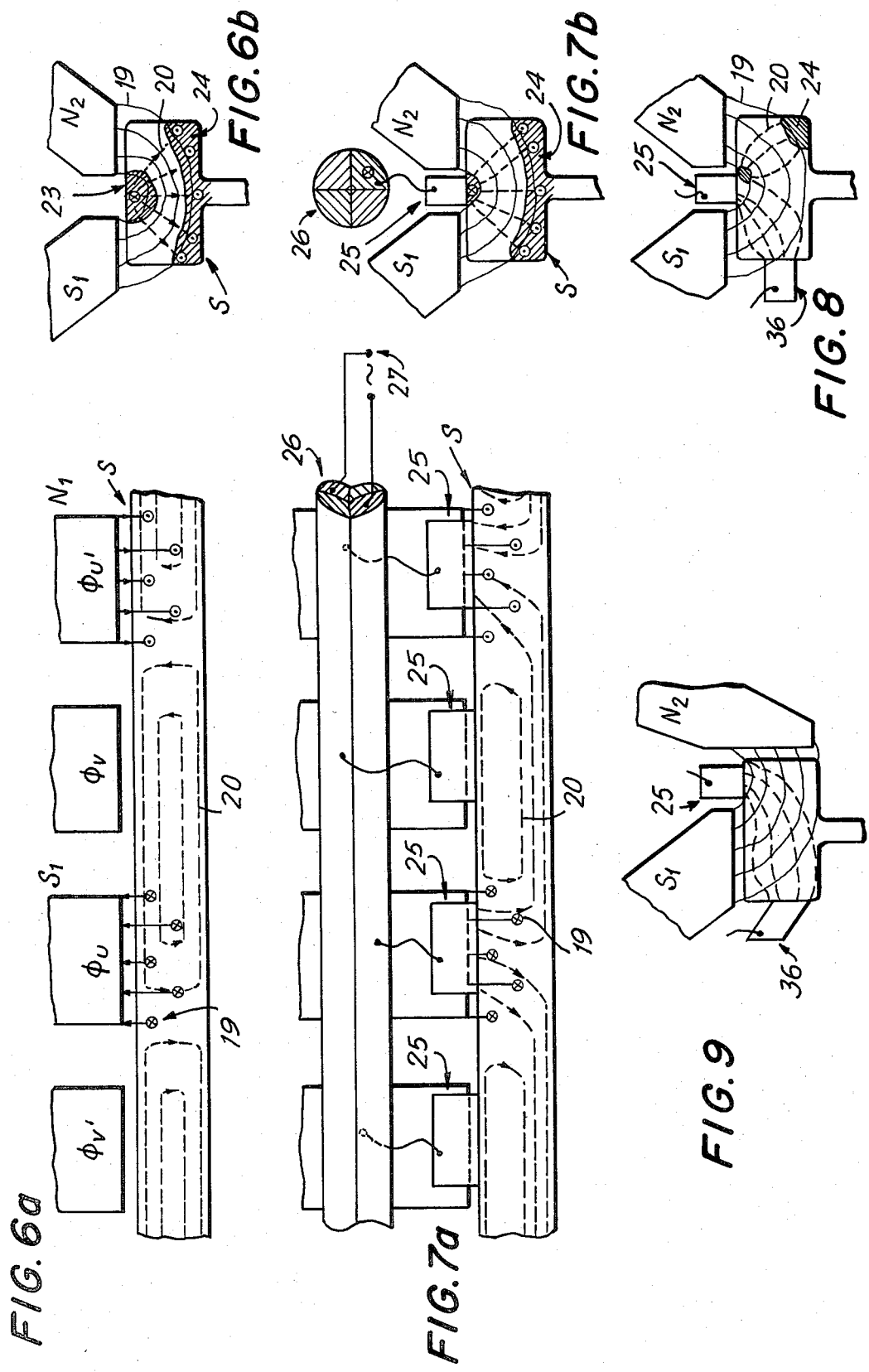

METHOD AND APPARATUS FOR GENERATING LINEAR ELECTROMAGNETIC TRAVELLING FIELDS FOR DRIVING AND INCREASING THE ADHESIVE LOAD OF RAILWAY MOTORED VEHICLES

CROSS-RELATED APPLICATION

This application is a continuation-in-part of Ser. No. 497,057 filed Aug. 13, 1974 and now abandoned.

BACKGROUND (a) Field of the Invention

The invention relates to apparatus and methods for improving the drive of a vehicle on a steel rail by means of travelling magnetic fields whose lines of force pass transversely through the rails.

(b) Prior Art

The first linear induction motor, applied to railroad traction, in terms in which it is usual today to describe such motors, was patented by Zehden in 1905 as referred to by Chirgwin in Recherche sur les moteurs linéaires à induction aux Etats-Unis, in "Bulletin de l'A.I. du Congrès des Chemins de Fer", Dec. 1967, p. 793. Zehden's Patent was forgotten and it was Professor Laithwaite, then at the University of Manchester, who resurrected, half-a-century later, the idea of the linear motor, although, in the words of Pierre de Latil, "he did not foresee, as an application, anything else than the shuttle movements on weaving-machines" (P. de Latil—Le metro sous coussin d'air, in "Sciences at Avenir", No. 234, Avril, 1968, pp. 304-305). Laithwaite also promulgated afterwards, the theory of the linear motor (E. R. Laithwaite—Induction Machines for Special Purposes, George Newnes Ltd., London 1966.) and, from his work and that of Poloujadoff, in France, and of W. W. Seifert, in the United States, among others, an explosion of interest came about recently regarding linear electric motors applied to railroad traction.

In general, these motors consist of a linear three-phase primary winding (inductor) and a fixed secondary formed by a special rail made of metal of high electrical conductivity, this rail being different in construction and separate from the rails used for supporting and guiding the train in conventional railroads.

An exception is found in British Pat. No. 1,200,201 (TASSIN). The secondary of the induction motor in this British Patent, is, as in the present invention, the supporting rail of the railroad. However, Tassin's induction motor is a longitudinal flux machine; the lines of force of its magnetic field are contained in a plane that contains also the direction of motion of the travelling field. It is the equivalent of a conventional rotary induction motor, the stator of which has been opened out flat.

The machine in the present invention, as will be shown later on, cannot be obtained by such a simple operation as opening out flat, in thought, a machine of conventional design. The lines of force of its magnetic travelling field lie in planes that are perpendicular to the direction of travel of the field: it is a transverse flux machine. This machine is clearly a new departure as regards conventional induction motors; it is different from Tassin's motor both in concept and in performance.

The machine in the present invention differs also from the motor described in U.S. Pat. No. 3,585,423 (BOLTON) in at least one feature: it belongs to a different family of transverse flux machines. This difference will become readily apparent if one makes the "thought-operation" opposite to the above mentioned one: coiling round in a ring the linear machines in this comparison. From the Tassin motor a conventional induction rotary motor (longitudinal flux) is at once obtained.

From the Bolton-Lauthwaite's motors there results transverse flux machines, the topology of which is "not convenient or profitable"; "a rotary t.f.m. is cumbersome to construct" says Prof. Laithwaite in the Electrical Times (see "Inverter System is not vital to traction by linear motor"—Electrical Times, Oct. 18, 1974, pgs. 6-7).

From the machines described in the present invention result transverse flux machines that are not cumbersome at all. In the pure induction configuration these machines are yet to be manufactured but, when they are, they cannot be mistaken with those of Prof. Laithwaite which "are cumbersome to construct". In the configurations that include a system of electrical brushes, some of the resulting machines do exist already. It is the case of the d.-c. homopolar generator which is a limiting or degenerate form of these machines. The homopolar generator is a rotary transverse flux machine that corresponds to the transverse flux shoes braking device described by Parody et Tetrel in 1935, when to this device are added a non-null air-gap and a system of brushes to collect the emfs. generated in the secondary. This device was in the origin of the conception of the machines in this invention.

SUMMARY OF THE INVENTION

The invention is concerned with an induction linear motor, the main advantage of which is to use the guiding rails of the existing railroad track as the motor secondary and, also to use such a secondary with great efficiency.

Such motor, or a combination of such motors, can be used unassisted or be associated with conventional rotary drive motors on the same bogie-truck. Especially in this case extremely high tractive forces will be possible, making the process very useful in cases such as locomotives for heavy-drag freight services, e.g. ore freight trains and locomotives and motor-coaches for use in mountainous territory, namely in lines that connect high-traffic seaports with important high-altitude locations. It may be mentioned here that the invention is the result of an attempt to find a solution to the transport problems encountered in a railway line in this category (the line between Paranaguá and Curitiba, in Brazil) through the association of the concept of the linear induction motor and the concept of electromagnetic braking by means of transverse flux line shoes, as described by H. Parodi and A. Tétrel in "La Traction Electrique et le Chemin de Fer"—Tome I, Dunod, Paris, 1935, pp. 518-522.

The invention specifically contemplates utilizing the support and guide rails for the vehicle as the motor secondary and employing as the primary an inductor which generates a travelling magnetic field along the rail. The magnetic field is intended firstly to increase the adhesive load of the vehicle on the rails in order to increase the permissible drive and braking forces without increasing the weight of the vehicle, and, secondly, to assist directly the driving or braking performance of said vehicle as explained later on. The term "adhesive load" refers to the bearing load applied to the rails by the driving axles.

BRIEF DESCRIPTION OF THE DRAWING

FIG. 1-b shows another embodiment of pole pieces;

FIG. 1-c is a diagrammatic illustration in side view of an inductor showing individual lamination packs forming pairs of poles;

FIG. 1-d is a wiring diagram for one of the electrical power phases;

FIG. 1-e is a graphical illustration of mmf, with respect to distance along the rail in the outer gap for the different phases;

FIG. 4 is a side elevational view of an articulated platform fitted with linear inductors;

FIG. 5 is a side elevational view of one of the platform elements in greater detail;

FIG. 6-a is a diagrammatic illustration in side view of a two-phase inductor facing the head of a rail;

FIG. 6-b is a diagrammatic illustration in front view of same inductor;

FIG. 7-a is a diagrammatic illustration in side view of an inductor having associated with it a set of inner-brushes;

FIG. 7-b is a diagrammatic illustration in front view of the same inductor and the same brushes;

FIG. 8 is a diagrammatic illustration in front view of an inductor having associated with it a set of inner-brushes and a set of outer-brushes;

FIG. 9 shows another embodiment of pole pieces and brush sets;

FIG. 11-b is a diagrammatic illustration in front view of inductor and brushes shown in FIG. 11-a.

DETAILED DESCRIPTION

Figure 1C:
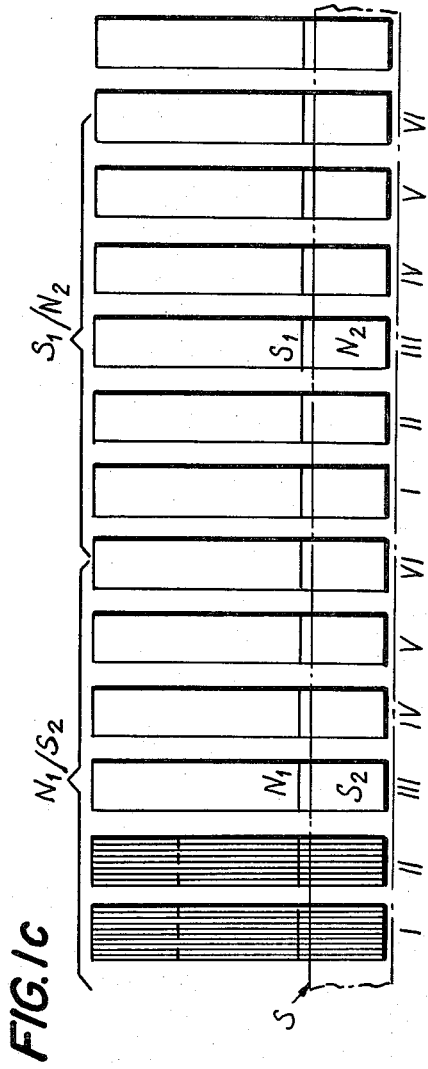
FIG. 1-a is a diagrammatic illustration of a front view of one embodiment of pole pieces of an inductor in relation to the upper portion of a rail.
Figure 1A:
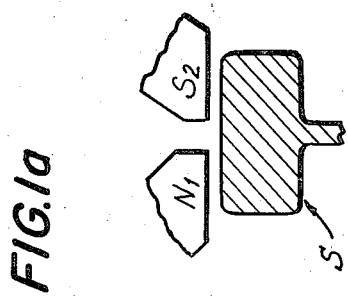
Figure 1D:
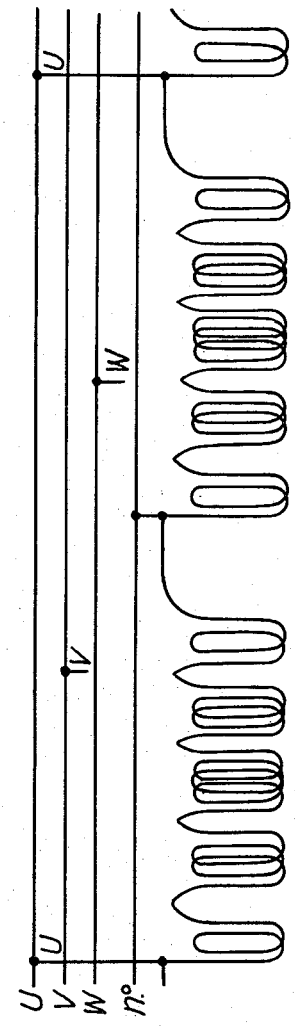
Figure 1B:
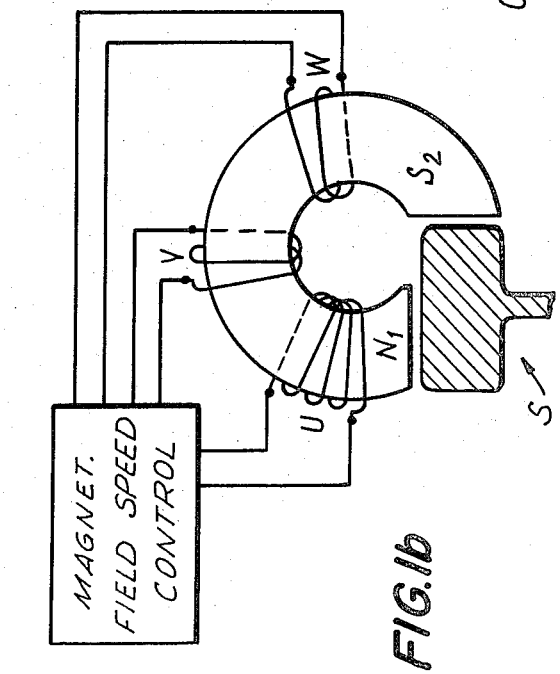
Figure 1E:
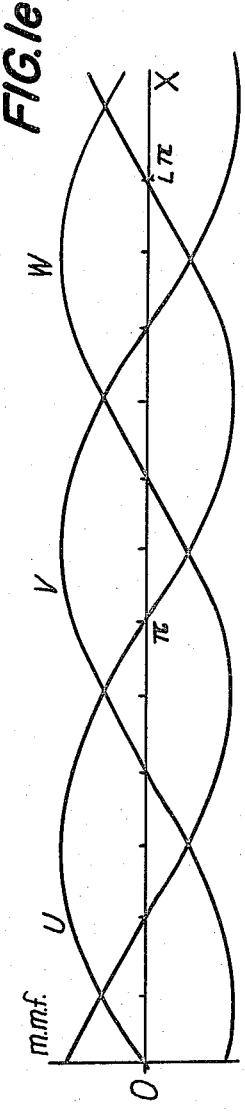

Referring to FIGS. 1a-1d, therein are seen diagrammatic arrangements of a linear induction motor consisting of a sliding inductor or primary, which moves with the vehicle and generates travelling magnetic fields, and a stator or secondary which is the support rail of a railroad track.

Said inductors can, in practice, have several different forms but, in view of the special characteristics of the secondary, i.e. the rail, some forms will be more suitable then others. The forms illustrated are those that make the best use of the secondary characteristics.

The inductors shown are three-phase alternating current inductors, and they comprise pairs of magnetic poles, facing the upper flange or head of the rail, said poles being arranged in two conjugated sequences of n poles, parallel to the rail. In FIG. 1-a one sequence faces the outer portion of the rail and the other the inner portion of the rail at the upper surface of the rail. In FIG. 1-b, one sequence faces the upper surface of the rail and the other sequence faces the inner cheek of the rail.

Instead of a three-phase system, other types of polyphase currents can, of course, be used to generate these travelling fields.

Each inductor comprises a series of magnetic circuit elements made of lamination packs arranged as shown in FIG. 1-c wherein each pack has the form of FIGS. 1-a or 1-b. Coils with a different number of turns for the different phases U, V and W of the alternating current are wound on each of these elements in such a way as to generate, for each set of packs (in the illustrated embodiment m=6) and for each phase, one pair of conjugated poles, e.g. N1/S2, N1 being positioned to define an outer air-gap and S2 being positioned to define an inner air-gap, the field intensity of said poles having substantially a sine-distribution along the pole length.

In FIGS. 1a-d, there is shown the electrical connections of the coils for phase U for the first two pole pairs, N1/S2 and S1/N2. The electrical connections for phases V and W are not shown as they are identical in all respects except that they are spaced in electrical degrees 360°/3 and 2×360°/3, respectively, regarding the diagram for phase U.

Poles N1, S1, . . . , relating to phase U, generate at the outer air-gap a sinusoidal alternating magnetic field which, associated with the fields relating to phases V and W on the same air-gap, produces a magnetic field travelling along the rail from U to V.

A space distribution of the magnetic fields relating to phases U, V and W, existing in the outer air-gap at instants t, t+T/3, t+2T/3 respectively (T being the period of the alternating currents) is represented in FIG. 1-e. The magnetic fields that are found in the inner air-gap, are at all times, symmetrical to those in the outer air-gap, and produce a travelling magnetic field moving with the speed and in the direction of the outer air-gap field.

In the presence of the rail, as the secondary, these travelling magnetic fields produce two types of forces on the inductors or primaries. The forces of the first type are normal to the rail and are equivalent to an increase in the adhesive load per axle and hence permit increase either in the permissible tractive forces developed by conventional rotary drive motors that may be associated with the linear electrical motors on the same bogie-truck or, again, increase in the permissible braking force of any type that may be considered on the axles concerned. The forces of the second type are parallel to the rail and add directly either to the tractive effort or to the braking effort of the vehicle.

The speed relative to the rail of the travelling fields generated by the inductors depends on the frequency of the electrical currents feeding said inductors, the pole pitch of the pole sequences, and the vehicle speed with regard to the track.

By varying the frequency of said electrical currents and/or the pole pitch of said pole sequences it is possible, therefore, for any given speed of the vehicle, to change the speed relative to the rail of these travelling fields and consequently to vary directly the tractive forces or the braking forces as said earlier.

Referring to FIG. 1-b, there will be noted generally a means for varying the frequency of the electrical current to control the magnetic field speed relative to the rails. Such means may be of conventional commercially available construction. Additionally, it is equally possible to use conventional mechanical or electrical means to change the pole pitch of the pole sequences.

It should be noted that the number of poles n, in linear sequence in each of the air-gaps, need not be even (in fact, it need not even be an integer), as any pole in one of the air-gaps is directly coupled with a conjugate pole of the same intensity and opposite sign in the other air-gap.

As it has been already pointed out, the system of linear motors up to now described is particularly useful, when applied in conjunction with rotary motors, to supply the needed efforts (tractive or braking) in especially difficult circumstances, such as can occur at starting, or at braking, or again when the locomotive has to drive heavy trains up or down steep grades.

A method is described, in the following, of improving further the working of the linear motors used on such occasions, this method being specially useful when the linear motors are used alone, that is, when rotary motors have been dispensed with.

It consists briefly in replacing the pure induction motor, which was described above, by an induction machine the "primary" of which feeds the "secondary" with both a travelling magnetic field and a synchronous "travelling field" of currents. These currents (polyphase), the characteristics of which can be suitably modified or controlled in the vehicle, join with the currents induced in the secondary by the magnetic travelling field, compensating or correcting their unfavorable distribution and characteristics (phase, amplitude). In this way, the linear induction motor can be made to acquire, for example, the working characteristic of a series motor.

In FIGS. 6-a and 6-b there is shown a diagrammatic illustration, respectively in side and in front view, of a two-phase inductor facing the head of the rail (secondary) at a moment when magnetic flux is maximum for phase U. Lines of magnetic flux 19 and lines of electric current 20 are shown. The diagrams are much simplified but are included to show two kinds of unfavorable current distribution that can be improved by the present method: a phase displacement between lines of magnetic flux and lines of electric current (FIG. 6-a); a concentration of important return currents that flow horizontally in region 23 in the top of the rail (FIG. 6-b), this region being too narrow to accommodate currents of such magnitude.

FIGS. 7-a and 7-b, corresponding respectively to FIGS. 6-a and 6-b, are diagrammatic illustrations, that show the same inductor when associated with a set of brushes or injector means 25, that are fed with appropriate polyphase voltages, through a multi-conductor cable 26, from a suitable source 27. The arrangement enables the phase displacement situation to be improved and supplies an alternative route for currents flowing in region 23.

This set of brushes 25 (inner-brushes) can be used alone or be supplemented with another set of brushes 36 (outer-brushes), also fed from source 27; brushes 36 supply an alternative route for currents flowing horizontally in region 24 (FIG. 8).

FIG. 9 shows another embodiment of pole pieces, $S_1/N_2$, associated with a set of inner-brushes 25 and a set of outer-brushes 36.

It will be seen from FIGS. 7-b, 8 and 9, as compared with FIG. 6-b, that a more suitable distribution of electric currents is provided for cooperating with magnetic flux to produce horizontal (tractive or braking) forces.

Figure 10:
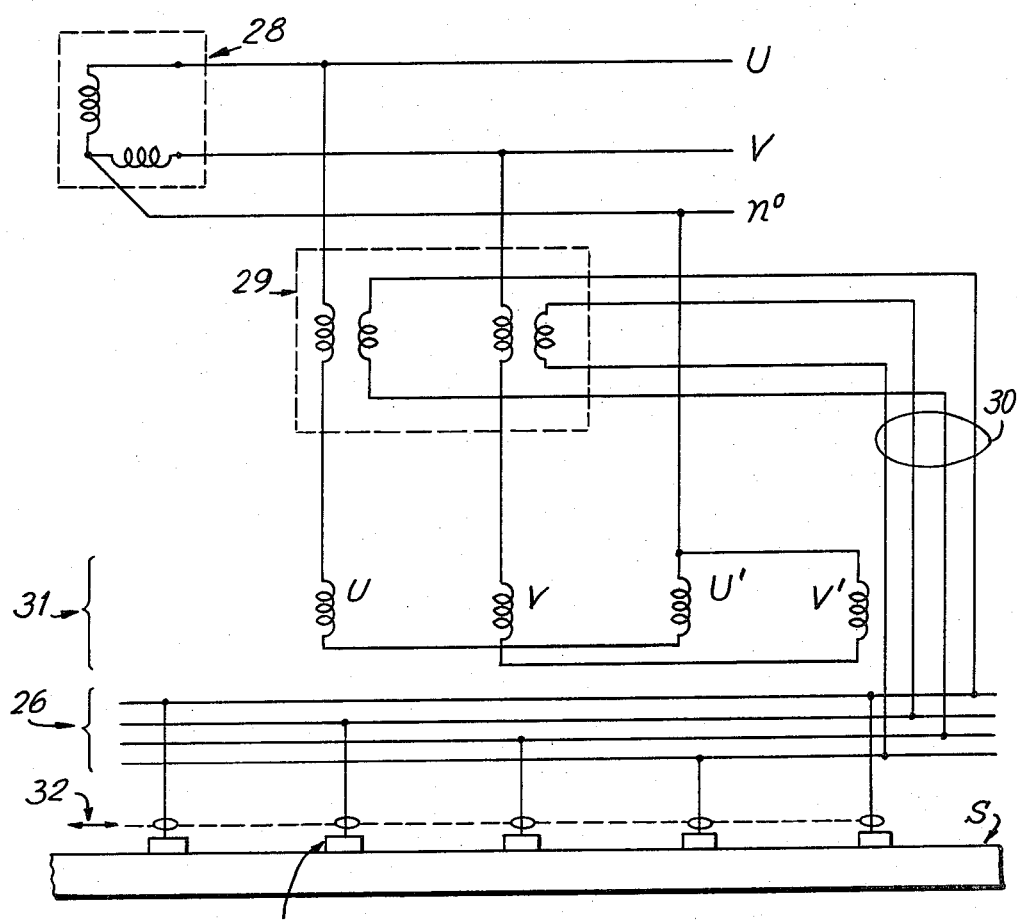
FIG. 10 is a wiring diagram for a two-phase motor including a set of inner-brushes.

FIG. 10 shows a wiring diagram for a two-phase motor including a set of inner-brushes. The brushes 25 slide and are positioned over the secondary S of the linear motor (the rail), in close relationship with poles U, V, U', V', of inductor 31. Brushes 25 are fed through four-conductor cable 26 and cables 30, and control system 29 from a two-phase power supply 28. In control system 29 there is shown a simple two-phase series transformer, but it can include other apparatus such as tap-changing transformers, induction voltage regulators, phase and frequency-convertors, or any other commercially available means of controlling the characteristics of the a.c. currents, supplied both to inductor 31 and to brushes 25. Further control of the currents on the secondary can be achieved by means of a brush-shifting mechanism 32 that shifts the set of brushes, as a whole, relative to the poles. It should be noted that, in a configuration such as this, having only inner brushes, a shift of the brushes through ±90 electrical degrees means a modification of the type of forces obtained, from horizontal (tractive or braking) to vertical (levitating or loading) efforts. To obtain the same effect with two sets of brushes, inner and outer brushes must be shifted in opposite directions. A mechanism (not shown) can also be provided for lifting up the brushes when their use is not desired.

Power supply 28 may consist of an electrical rotary generator and a suitable prime-mover carried on the locomotive or an electric apparatus, such as a transformer, connected through a current-collecting device to an external supply; and it may provide a number of phases different from the number used on the linear motors if control system 29 is made to include a suitable phase-converter system.

It will be noted that when the linear motor is made to acquire a series characteristic, among other cases, the speed of the motor is not limited by the (synchronous) speed of the travelling field. Independent control of the field intensity of the inductor and or of the magnitude of the currents injected on the secondary provide also a means of efficiently controlling the speed of the motor. Thus, if the travelling fields have a zero-speed relative to the inductor (for example, in the case of a d.c. inductor of a single-phase a.c. inductor) the present method can still provide a practical linear motor.

And it will be seen further that, if the number n of poles in linear sequence in each of the air-gaps be reduced to one, we revert to the first device from which the machine in the present invention has originated, namely the transverse flux line shoes brake system, now built, of course, so as to keep an air-gap all the time and to be associated with a system of brushes for injecting on, or collecting from the secondary, the necessary currents (FIG. 7-a and FIGS. 8 or 9). This machine is the linear equivalent of the rotary homopolar generator.

Figure 11A:
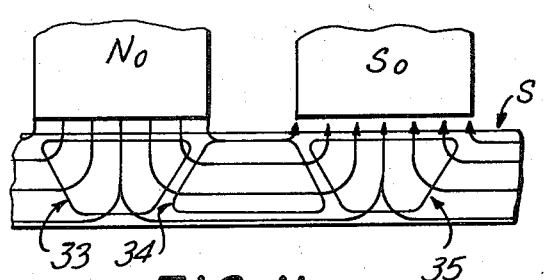
FIG. 11-a is a diagrammatic illustration in side view of part of a longitudinal flux inductor having associated with it two sets of brushes.
Figure 11B:
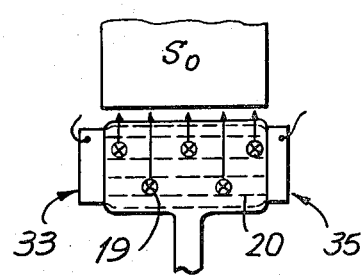

It should also be appreciated that in motors such as those, in which the speed is not mainly dependent on the speed of a travelling field, the inductors may revert to the longitudinal flux type without much trouble. It will suffice to reduce the size of the poles and to multiply their numbers to accommodate the necessary flux inside the narrow limits of the secondary (rail). Brushes will then be "side-brushes", as shown in FIGS. 11-a and 11-b, and there will be place again to distinguish brushes 33,35 for horizontal force (tractive and braking) from brushes 34, 37 for vertical forces (loading forces and weight reducing forces). Control of these forces can easily be achieved through control of the currents and/or the fields supplied to the secondary.

Finally, two observations should be made regarding the present method. Firstly, it is dependent on the economical obtention and feeding to the brushes of suitable currents of high intensity and very low voltage. Secondly, its effectiveness is limited by the limited current carrying capacity of the brushes, namely because of excessive contact voltages. There is, indeed, place for important developments in this area to bring the method to its full fruition; nonetheless, brushes are readily available commercially that make the method a practical and useful proposition at present.

Figure 2:
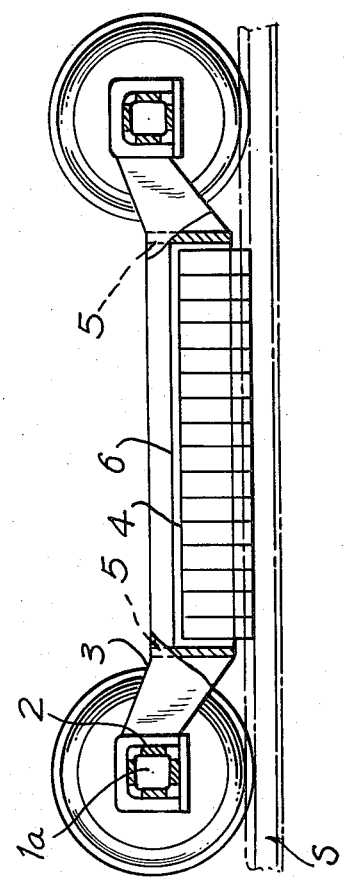
FIG. 2 is a side elevational view, partly broken away and in section, of a two-axle bogie truck fitted with a support frame carrying linear inductors.
Figure 3:
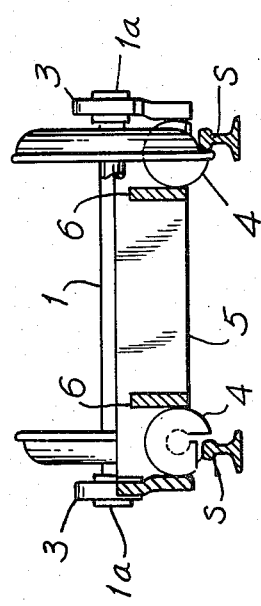
FIG. 3 is a front view, partly in section, of the bogie truck with one pair of linear inductors.

Referring to FIGS. 2 and 3 herein is shown the utilization of the linear inductors on a two-axle bogie-truck which travels on the rails S.

The bogie-truck comprises opposite axles 1 each carrying at its extremities an axle-bearing 1-a. Resilient pads of rubber or the like are mounted on the axle-bearings and carry support frame 3. A linear inductor 4 is mounted on each side of the frame, one for each rail, and the pole pieces have the shape as shown in FIG. 3.

The frame comprises inner and outer longitudinal beams designated by numerals 6 and 3 respectively on each side of the rail and connecting cross-pieces 5.

The rubber pads 2 must insure, in less favorable conditions, that the air-gaps will keep a value above a permissible minimum. In addition, for the arrangement as shown in FIG. 3 which corresponds to FIG. 1-b in which the inner pole pieces extend below the level of the upper surface of the rail, a minimum value for the inner air-gap corresponding thereto is provided by means of appropriate runners or skates (not shown).

Any of the intermediate spaces between the axles in a locomotive or motor-coach bogie-truck can be occupied by one linear inductor support frame. The support frames can be constituted as an electromagnetic articulated platform completely filling the length of the locomotive or motor-coach. Such electromagnetic platform can be extended to constitute an articulated underframe for a complete train, for example, a Talgo train or a driving platform for a containerized train.

The platform can be composed of standard elements, each comprising a support frame and respective linear inductors associated with either a driving axle and its rotary drive motor or a pair of wheels independently mounted on the frame and its respective rotary drive motor or motors, adjoining elements being connected by means of articulated joints or flexible couplings.

FIGS. 4 and 5 diagrammatically illustrate an articulated platform.

The arrangement of FIGS. 4 and 5 is similar to that of FIGS. 2 and 3 except for the provision of a hinge mounting of the frame. In FIG. 5 there is diagrammatically illustrated a drive motor 12 for each axle 1. A support frame 13 carries two linear inductors as in the previous embodiment. However, in the case of the embodiment of FIGS. 4 and 5, one end of the frame is connected by means of hinge 15 to the associated axle; also, drive motors 12 are shown mounted on the axles, their housings being supported on the frame 13 through resilient links 16.

It should be noted that the weight of the locomotive or motor-coach ceases to be a decisive or limiting factor with regard to its tractive effort because the adhesive load between the wheels and the rails will now depend mainly on the travelling magnetic fields generated by the inductors over the rails. The locomotives and motor-coaches can thus be made as light in weight as technical progress will permit and safety will sanction.

What is claimed is:

1. A method of improving the drive of a vehicle travelling on steel support and guide rails, said method comprising increasing the adhesive load of the vehicle on the rails, to correspondingly permit increase of the tractive and braking forces, by generating traveling magnetic fields in the rails by a system of linear inductors in elongated array along the rails and so arranged as to have lines of force which lie in planes perpendicular to the direction of travel of the magnetic field and pass transversely through the rails.

2. A method as claimed in claim 1 wherein each said rail is utilized as the secondary of an induction motor including linear inductors which serve as the primary, said motor contributing directly to the tractive force or the braking force of said vehicle.

3. Electrical induction apparatus for use on a vehicle travelling on steel support and guide rails, said apparatus comprising primary inductors for generating linear magnetic travelling fields along the rails to increase the adhesive load of the vehicle on the rails, said inductors being arranged in an elongate array along the length of the rails and including a plurality of pairs of poles adjacent the rails, said rails constituting a secondary, said poles forming two conjugate sequences along the rails, and means cooperating with said inductors and poles for generating lines of force which lie in planes perpendicular to the direction of travel of the magnetic field and pass through said rails transversely of the direction of travel of the moving fields.

4. Apparatus as claimed in claim 3 wherein said poles and inductors are arranged so that said fields contribute directly to the tractive force or the braking force of said vehicles.

5. Apparatus as claimed in claim 3 wherein said poles have pole faces parallel to one another and parallel to the upper surface of the rail in spaced location thereabove.

6. Apparatus as claimed in claim 3 wherein said poles have pole faces which are perpendicular to one another and define perpendicularly disposed gaps with the rails.

7. Apparatus as claimed in claim 3 comprising at least one bogie-truck for said vehicle, comprising spaced axles with at least one wheel mounted on each said axle, axle bearings and a frame mounted between said axles and supported on said axle-bearings, said truck also comprising means for mounting said inductors on said frame to extend longitudinally between said axles.

8. Apparatus as claimed in claim 7 wherein said frame also comprises one pivotal connection or articulation between the front and rear end thereof, to provide a non-rigid wheel-base to the associated axles.

9. Apparatus as claimed in claim 8 wherein there are included a plurality of said frames to form an articulated motor-platform.

10. Apparatus as claimed in claim 9 comprising a multiplebody vehicle mounted on said platform.

11. Apparatus as claimed in claim 7 comprising resilient pads on the axle-bearings and means mounting the frame on said pads.

12. Apparatus as claimed in claim 9 wherein said vehicle is mounted on said bogie-trucks.

13. Electrical linear apparatus for use on a vehicle travelling on at least one electrically conductive rail, said apparatus comprising both a primary inductor with poles for generating magnetic fields along said rail, said rail constituting a secondary and, injector means in pre-determined relative positions with respect to said poles, and control means for supplying said injector means and thereby said rail with electric currents which cooperate with said magnetic fields to produce longitudinal and transverse forces relative to said rail.

14. Apparatus as claimed in claim 13 wherein said vehicle includes a prime mover and an electric generator driven by said prime mover for supplying electrical power to said apparatus.

15. Apparatus as claimed in claim 13 wherein said vehicle includes collector means for transmitting electrical power from an external source to said control means and therefrom to said inductor and injector means.

16. Apparatus as claimed in claim 13 comprising means for shifting said injector means relative to said poles.

17. Apparatus as claimed in claim 13 comprising means for raising and lowering said injector means into contact with said rail.

18. Apparatus as claimed in claim 13 wherein said vehicle travels on two electrically conductive rails.

19. Apparatus as claimed in claim 8 comprising at least one bogie-truck for said vehicle and means mounting said apparatus on said truck to face said rails longitudinally.

20. Apparatus as claimed in claim 19 wherein said truck comprises spaced axles and means to provide a non-rigid wheel-base to said axles.

21. Apparatus as claimed in claim 20 wherein there are included a plurality of said trucks to form an articulated motorplatform.

22. Apparatus as claimed in claim 21 comprising a multiplebody vehicle mounted on said platform.

23. Apparatus as claimed in claim 19 wherein said vehicle is mounted on said bogie-trucks.

* * * * *